United States Patent

[11] 3,567,978

[72] Inventor Louis W. Parker
c/o Parker Electronics Inc. 2040 N. Dixie Hwy., Fort Lauderdale, Fla. 33305
[21] Appl. No. 869,057
[22] Filed Oct. 24, 1969
[45] Patented Mar. 2, 1971

[54] AXIAL AIRGAP MOTORS WITH REDUCED IRON LOSSES
8 Claims, 6 Drawing Figs.
[52] U.S. Cl. .................................................. 310/124, 310/268
[51] Int. Cl. .................................................. H02k 23/60
[50] Field of Search ......................................... 310/124, 112, 114, 125, 268, 166

[56] References Cited
UNITED STATES PATENTS
1,829,686 10/1931 Swendsen .................... 310/124X
3,277,323 10/1966 Parker ......................... 310/268X
3,469,134 9/1969 Beyersdorf et al. ............ 310/268X Primary Examiner—D. F. Duggan
Attorneys—William D. Hall, Elliott I. Pollock, Fred C. Philpitt, George Vande Sande, Charles F. Steininger and Robert R. Priddy ABSTRACT: An axial airgap motor is provided comprising two end rotors, a plurality of stators spaced from one another between said end rotors, and at least one further rotor positioned between the stators. Each end rotor includes a relatively massive magnetic ring having a radial length which is the same as the radial length of the pole pieces in the adjacent stator; and said magnetic ring has an axial cross-sectional area equal to substantially one-half the total radial cross-sectional area of the laminated stacks composing one pole in said adjacent stator.

PATENTED MAR 2 1971 3,567,978
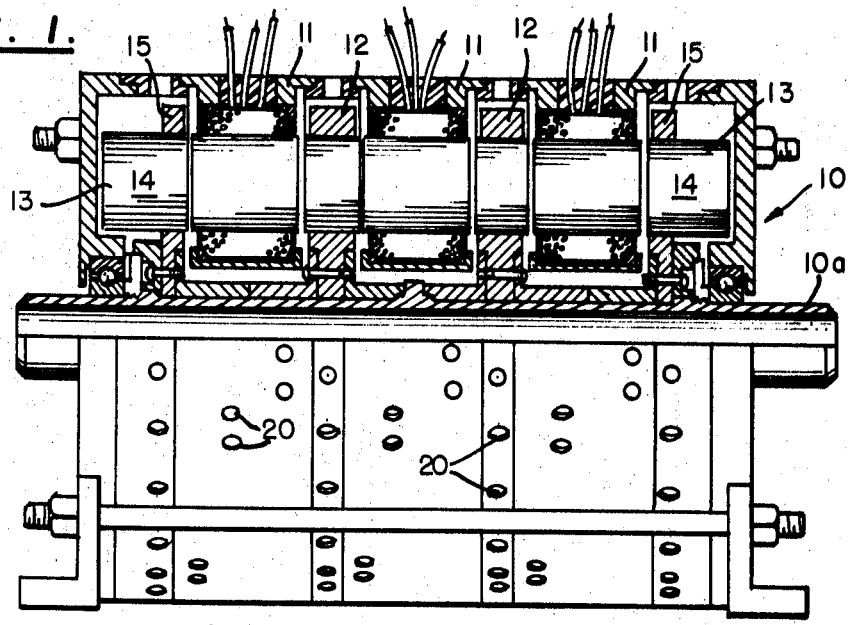
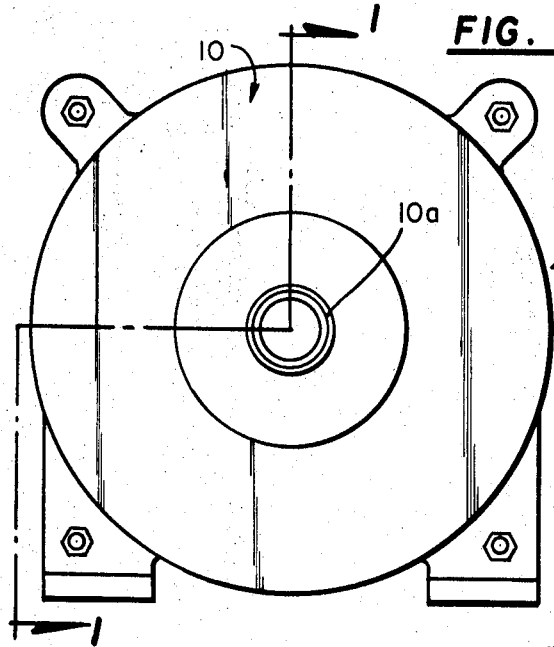
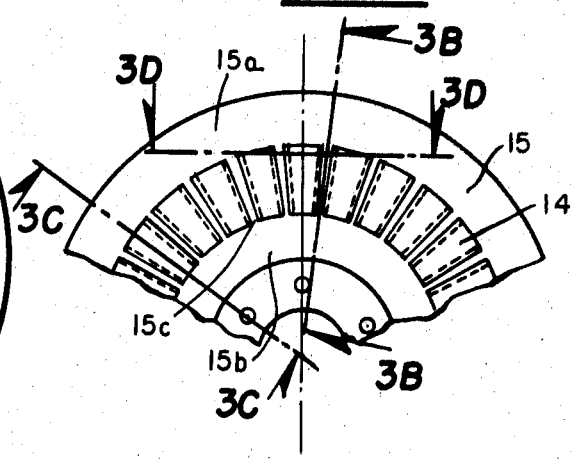
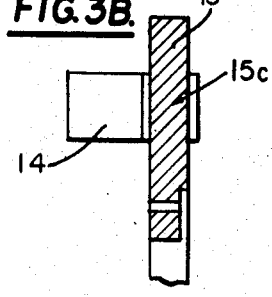
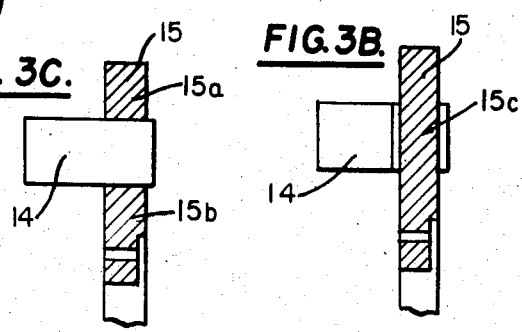
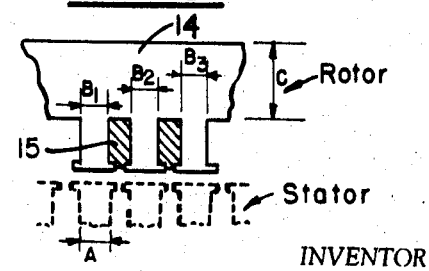
INVENTOR
Louis W. Parker
BY
ATTORNEY

AXIAL AIRGAP MOTORS WITH REDUCED IRON LOSSES

BACKGROUND OF THE INVENTION

The present invention is concerned with axial airgap electric motors embodying the principles described in my prior U.S. Pat. No. 2,479,589. One practical application of these principles is disclosed in my prior U.S. Pat. No. 3,277,323; and each of these patents is incorporated by reference into the present disclosure for a full discussion of the principles involved, and the general manner in which they may be practically embodied.

The step by step evolution of axial airgap machines, as described in my prior U.S. Pat. No. 2,479,589, achieves a very substantial decrease in the need for iron cores in the interior rotors and stators of the machine, but leaves the end stators practically unchanged. Inasmuch as iron losses occur in direct proportion to the total mass of iron employed, and since a large part of the iron still remains in the machine, the iron losses in a machine of the type described in my prior U.S. Pat. No. 3,277,323 remained at a fairly high level. The losses in the end stators in some cases amount to 50 percent or more of the total iron losses.

Most of the iron in the end stators is located in the rings connecting the magnetic poles, and a lesser amount is present in the pole pieces of the stator itself. The present invention is primarily concerned with reducing the iron losses in these rings and pole pieces to nearly zero, while otherwise retaining all of the desirable qualities of the general type of the machine in question. The limit of loading of the machine is determined mainly by its heating. If iron losses are reduced, more copper losses can be permitted without overheating occurring. In this way, more power output can be obtained from the motor or generator; or a higher efficiency can be achieved if the load is not increased.

In order to reduce the iron losses, the present invention relies on the principle that if the frequency in the iron is reduced, the losses are also reduced. It is well known in this respect that eddy current losses are proportional to the square of the frequency and that the hysteresis losses are proportional to approximately the 1.8 power of frequency. The present invention is concerned with an improved axial airgap machine wherein the frequency in the end stators is reduced from 60 Hz. to 1 Hz. or less. This is done by rotating the end stators together with the rotors, i.e., in effect, the end stators are eliminated and replaced by rotor structures with the overall machine operation otherwise remaining unchanged.

The general concept of providing a machine employing an interior stator cooperating with a pair of end rotors has, in itself, been suggested heretofore. Arrangements of this type are disclosed in Fodor U.S. Pat. No. 3,275,863, Watson U.S. Pat. No. 3,048,723, and Roters U.S. Pat. No. 3,023,330. While these references have suggested the use of end rotors, they have not recognized or taught various important dimensional relationships which should be observed between said end rotors and an adjacent stator structure to achieve practical operation in the overall machine. Moreover, such references fail to contemplate the provision of an interior rotor which cooperates with the end rotors, or to contemplate the dimensional relationships between such an interior rotor and end rotors which must be observed to effect a desired increase in efficiency and an increase in the power to weight ratio of the overall machine.

SUMMARY OF THE INVENTION

The present invention is concerned with a machine similar to the one illustrated in my prior U.S. Pat. No. 3,277,323, but employs a plurality of interior stators and no end stators. The improved machine, instead of employing end stators, employs a pair of end rotors which support laminated end rings comprising portions of the rotors which rotate with them. These end rotors correspond, operationally, to the stationary end rings in U.S. Pat. No. 3,277,323; but, due to the fact that the end rotors are normally only about one revolution per second behind the rotating magnetic field in the machine (assuming 60 cycles and four poles) the effective frequency in the end rings is reduced to about 1 Hz. As a result, the eddy current and hysteresis losses in the iron of the end rotors are several orders of magnitude below that of the machine disclosed in U.S. Pat. No. 3,277,323, and these losses may, for all practical purposes, therefore be disregarded in comparison with the other iron losses in the stators and rotors of the machine. These other iron losses may be reduced by employing magnetically aligned high permeability materials C both the stators and rotors. This can be done due to the fact that, unlike other forms of motors and unlike the end rotors, the magnetic field travels always in the same direction and in a nearly straight line in the inside rotors and stators. The combination of end rotors and magnetically aligned stacks gives the lowest iron losses the present state of the art can achieve.

In order to achieve most efficient operation, various important dimensional considerations are observed in the fabrication of the end rotors and adjacent stator structures. The magnetic rings in the end rotors are fabricated to exhibit an axial cross-sectional area equal to nearly half the total radial cross-sectional area of the laminated stacks composing one pole of the stator. In addition, the radial length of the magnetic ring in each end rotor is made to be substantially the same as the radial length of the pole pieces in the adjacent stator. The considerations leading to these dimensional relationships will be discussed.

In addition to using end rotors, the improved machine of the present invention may employ at least one interior rotor which is constructed in a manner similar to that described in my prior U.S. Pat. No. 3,277,323. The interior rotor or rotors employed are constructed to be thinner and far less heavy than the end rotors; and the use of such an interior rotor increases the torque of the machine far more than in direct proportion to the increased size and weight of the machine resulting from addition of the interior rotor. As a result, the use of an interior rotor in conjunction with the aforementioned end rotors increases the power to weight ratio of the machine, or its efficiency, or both.

BRIEF DESCRIPTION OF THE DRAWINGS

FIG. 1 illustrates, in partial section an induction motor constructed in accordance with the present invention;

FIG. 2 is an end view of the motor shown in FIG. 1 and indicates the line 1–1 on which the section of FIG. 1 is taken;

FIG. 3A is a partial end view of an end rotor constructed in accordance with the present invention;

FIGS. 3B and 3C are cross-sectional views of the end rotor taken on lines 3B–3B and 3C–3C of FIG. 3A respectively; and FIG. 3D is a further view of the end rotor taken on line 3D–3D of FIG. 3A and also illustrates certain areal relationships between portions of the end rotor and portions of the adjacent stator.

DESCRIPTION OF THE PREFERRED EMBODIMENTS

FIGS. 1 and 2 illustrate side and end views respectively of an axial airgap machine constructed in accordance with the present invention. Such a machine includes a housing; and also includes rotor and stator structures spaced from one another within said housing, and cooperating with appropriate air entry orifices 20 in the housing, which permit cooling air to enter and circulate through the machine during normal machine operation. Reference is made to my prior U.S. Pat. Nos. 3,277,323; 3,296,475; and 3,413,503 which discloses in general, the manner in which the various portions of the machine may be fabricated, assembled, etc., as well as the important cooling considerations achieved by use of the various orifices 20. The disclosures of these prior patents are incorporated herein by reference for a discussion of all these considerations.

In accordance with the improved form of invention disclosed in FIG. 1, the machine 10 comprises three interior stators 11 and no end stators. Stators 11 are, as shown in FIG. 1, disposed in spaced relation to one another along the axis of the machine as defined by main shaft 10a of said machine; and shaft 10a carries a pair of interior rotors 12 thereon for rotation therewith. Two such rotors 12 are illustrated in FIG. 1, spaced from one another respectively adjacent the several stators 11. It will be appreciated that if only two stators 11 are employed, there would be only a single interior rotor 12, and that if more than three stators 11 are employed, more than two such interior rotors 12 would also be employed. Rotors 12 are constructed in the manner described in my prior patents, identified above. Stators 11 and rotors 12 each comprise pole pieces which are preferably composed of sheet metal laminations magnetically aligned with one another in an axial direction.

In addition to the inside rotors 12, the overall machine includes two end rotors 13 carried by shaft 10a for rotation therewith and with rotors 12. Each end rotor 13 takes the form of laminated end rings 14 carried by a conductive element 15. The end rotors 13 (14, 15) correspond operationally to the stationary end rings described in my prior U.S. Pat. No. 3,277,323. However, in distinction to the arrangement used in this prior patent, the laminated end rings 14 in the improved arrangement of the present invention comprise a portion of the rotors 13 and therefore rotate with them.

Due to the fact that the end rotors 13 are normally only about 1 revolution per second behind the rotating magnetic field in the machine (assuming 60 cycles and four poles), the effective frequency in the end rings 14 is only about 1 Hz. Therefore the eddy current and hysteresis losses in the iron of the end rotors are very significantly below that in my earlier patents where the end pieces were stationary. The losses in the end rings 14 are, indeed, so significantly reduced that they can actually be disregarded in comparison with the iron losses which occur in stators 11.

Various dimensional considerations should be observed in the fabrication of end rotors 13. First, it should be noted that the conductors 15 on the end rotors 13 have only about one-half the cross-sectional area of the conductors on the inside rotors 12. This consideration is best shown in FIG. 1. The overall end rotors 13 are, however, substantially heavier and thicker than inside rotors 12 since end rotors 13 carry the relatively massive rings 14 that conduct the magnetic field from one pole to another. In addition, of course, end rotors 13 produce only about one-half the torque which is produced by each inside rotor 12 since each end rotor receives a magnetic pull on only one side thereof.

As is best illustrated in FIG. 3D, each magnetic ring 14 should have an axial cross-sectional area equal to nearly one-half the total cross-sectional area of the laminated stacks composing one pole in the stator. This can be stated by the equation:

$$C = \frac{B_1 + B_2 \cdots B_n}{2}$$

where $C$ represents the axial cross-sectional area of each magnetic ring 14, and $B_1, B_2$ *** denote respectively the individual radial cross-sectional areas of the laminated stacks composing one pole in the stator. This particular relationship is required inasmuch as the same amount of magnetic flux must pass through both the rotor and stator; but the factor of one-half, in the equation given above, enters the picture inasmuch as the magnetic field is split in two after it leaves the pole of the stator, with the two halves going in opposite directions through the ring 14. Inasmuch as the frequency in rings 14 is very low, it is permissible to reduce the radial cross-sectional area of the rotor pole pieces by about 10 percent without any substantial increase in the iron losses. This consideration can be stated by the expression:

$$B = KA \quad (IPS)$$

where $B$ is the radial cross-sectional area of each pole piece on the end rotor 13; $A$ is the radial cross-sectional area of a corresponding pole piece on an adjacent stator; and $K$ is a constant having the approximate magnitude of $0.8 \pm 0.1$.

In addition to the dimensional consideration discussed above, the radial length of each magnetic ring 14 should be the same as the radial length of the pole pieces in an adjacent stator 11. This assures that the conductors on each end rotor are reduced to their lowest practical length, thereby reducing the resistance in the end rotors to their maximum possible extent. An unnecessary increase in the resistance at this portion of the structure would substantially increase losses without producing any attendant operational advantages.

One mode of constructing the end rotors is shown in FIGS. 3A through 3D inclusive. In accordance with this method, slots can be milled or punched in the end rings 14 (see especially FIG. 3D) and aluminum or other suitable metal can then be cast around the end ring 14 and into such slots in a metal form to form an outer cast ring portion 15a, an inner cast ring portion 15b, and intervening radially extending cast portions 15c, all integral with one another and in firm contact with magnetic ring 14. The cast aluminum then serves as conductor 15, and also acts as the supporting member for the entire end rotor structure. The end rings 14 can be made by winding up a silicon steel strip or ribbon, or said end rings 14 can take the form of solid magnetic material.

The overall operation of the machine is very substantially enhanced by the use of one or more inside rotors 12 cooperating with the end rotors 13 and with stators 11. The use of such inside rotors 12 increases the torque of the motor far more than in direct proportion to the increased size and weight of the machine produced by addition of such rotors 12. This is due to the higher torque to weight ratio of the inside rotors 12. Higher torque is achieved by reason of the fact that both sides of the rotor are subjected to magnetic pull; and the lighter weight for inside rotors 12 is achieved due to the absence of end rings (such as 14) thereon. By using two outside rotors in conjunction with one or more inside rotors, therefore, and by observing the various dimensional considerations already discussed, the overall machine of the present invention is not only capable of very substantially reducing losses, but is also capable of achieving increased torque, better efficiency, and an increased power to weight ratio.

I claim:

1. An axial airgap motor comprising a main shaft, two end rotors mounted in spaced relation to one another on said shaft for rotation therewith, each of said end rotors comprising a ring of magnetic material carried by a conductive support structure in coaxial relation to said shaft, each of said magnetic rings comprising a plurality of superposed, axially extending laminations of ferrous material having an axial dimension greater than that of its associated conductive support structure, said conductive support structure comprising a unitary casting of conductive nonmagnetic metal having a first ring portion in engagement with and surrounding the outermost periphery of said magnetic ring, said unitary casting also including a second ring portion in engagement with the innermost periphery of said magnetic ring and extending from said innermost periphery to said shaft to support said end rotor on said shaft, and said unitary casting further including integral portions extending radially between said first and second ring portions in firm engagement with radially extending portions of said magnetic ring, a plurality of stators spaced from one another between said end rotors and about said shaft, each of said end rotors and each of said stators comprising a plurality of pole pieces, the radial cross-sectional area of said end rotor pole pieces being substantially 10 percent less than the radial cross-sectional area of the stator pole pieces adjacent thereto, and at least one further rotor positioned between the stators and carried by said shaft for rotation therewith, said further rotor having a maximum axial dimension less than the axial dimension of the laminated magnetic ring in either of said end rotors.

2. The motor of claim 1 wherein each of said stators comprises a plurality of pole pieces, each of said magnetic rings having a plurality of radially disposed slots therein, said radially extending integral portions of said casting extending through said slots, the radial length of said slots and of the conductive portions therein being the same as the radial length of the pole pieces in the stator disposed adjacent to said magnetic ring.

3. The motor of claim 1 wherein each of said magnetic rings has an axial cross-sectional area equal to substantially one-half the total radial cross-sectional area of the pole pieces composing one pole in the stator disposed adjacent to said ring.

4. The motor of claim 1 wherein said further rotor comprises magnetic material carried by a conductive support, the axial length of the conductive support of said further rotor being greater than the axial length of the conductive support structure in each of said end rotors.

5. The motor of claim 4 wherein the axial length of the conductive support of each end rotor is substantially one-half the axial length of the conductive support of said further rotor.

6. The motor of claim 1 wherein said stator pole pieces are composed of magnetically aligned sheet metal laminations.

7. The motor of claim 1 wherein said inside rotor comprises magnetically aligned sheet metal laminations.

8. An axial airgap motor comprising a main shaft, two end rotors mounted in spaced relation to one another on said shaft for rotation therewith, each of said end rotors comprising a laminated ring of magnetic material carried by a conductive support structure in coaxial relation to said shaft, the laminations in each of said magnetic rings extending in an axial direction, each of said laminated magnetic rings having radially extending slots therein, said conductive support structure comprising a unitary casting of conductive metal having a first ring portion coaxial with said shaft and engaging the outermost periphery of said magnetic ring, said unitary casting also including a second ring portion coaxial with said shaft engaging the innermost periphery of said magnetic ring and extending from said innermost periphery to said shaft to support said end rotor on said shaft, and said unitary casting further including integral portions extending radially between said first and second ring portions and through said radially extending slots in said magnetic ring, the axial dimension of said first and second ring portions being less than the axial dimension of said magnetic ring, whereby each of said magnetic rings protrudes outwardly from its associated conductive support structure in an axial direction, and a ring-shaped stator disposed between said end rotors in coaxial relation to said shaft, said stator comprising a plurality of magnetic laminations extending in an axial direction, the cross-sectional area of each of said laminated magnetic rings being equal to substantially one-half the total cross-sectional area of the portion of said stator laminations composing one pole in said stator.